(12) United States Patent
Provitola

(10) Patent No.: US 7,086,735 B1
(45) Date of Patent: *Aug. 8, 2006

(54) ENHANCEMENT OF VISUAL PERCEPTION

(76) Inventor: Anthony Italo Provitola, P.O. Box 2855, DeLand, FL (US) 32721-2855

( * ) Notice: Subject to any disclaimer, the term of this patent is extended or adjusted under 35 U.S.C. 154(b) by 0 days.

This patent is subject to a terminal disclaimer.

(21) Appl. No.: 11/222,733

(22) Filed: Sep. 10, 2005

Related U.S. Application Data

(60) Provisional application No. 60/685,737, filed on May 27, 2005.

(51) Int. Cl.
*G03B 21/00* (2006.01)
*G02B 27/22* (2006.01)

(52) U.S. Cl. .................. 353/10; 353/7; 353/28; 359/475; 359/478

(58) Field of Classification Search ............ 353/10, 353/28, 7, 122; 359/443, 451, 462, 466, 359/475, 478; 348/42, 44, 51, 54; 352/86
See application file for complete search history.

(56) References Cited

U.S. PATENT DOCUMENTS

| | | | |
|---|---|---|---|
| 2,679,188 A | 5/1954 | Gould | |
| 2,943,964 A | 7/1960 | Goldenberg | |
| 3,582,961 A * | 6/1971 | Shindo | 348/44 |
| 3,701,581 A * | 10/1972 | Henkes, Jr. | 359/478 |
| 4,517,558 A | 5/1985 | Davids | |
| 4,633,322 A | 12/1986 | Fourny | |
| 4,819,085 A | 4/1989 | Liang | |
| 5,172,266 A | 12/1992 | Garcia et al. | |
| 5,257,130 A * | 10/1993 | Monroe | 359/478 |
| 5,291,330 A | 3/1994 | Daniels | |
| 5,488,510 A | 1/1996 | LeMay | |
| 5,510,832 A | 4/1996 | Garcia | |
| 5,541,642 A | 7/1996 | Ashbey | |
| 5,556,184 A | 9/1996 | Nader-Esfahani | |
| 5,751,927 A * | 5/1998 | Wason | 345/419 |
| 5,806,218 A * | 9/1998 | Shanks et al. | 40/427 |
| 5,886,771 A | 3/1999 | Osgood | |
| 6,414,681 B1 * | 7/2002 | Ohshima et al. | 345/428 |
| 6,530,662 B1 | 3/2003 | Haseltine et al. | |
| 6,536,146 B1 | 3/2003 | Ericson | |
| 6,742,892 B1 | 6/2004 | Liberman | |
| 6,929,369 B1 | 8/2005 | Jones | |
| 2005/0052617 A1* | 3/2005 | Fujikawa et al. | 353/10 |
| 2005/0206582 A1* | 9/2005 | Bell et al. | 345/6 |

* cited by examiner

*Primary Examiner*—W. B. Perkey
*Assistant Examiner*—Rochelle Blackman

(57) ABSTRACT

A system, device within a system, and a method for enhancing visual perception in a two-dimensional image is disclosed, providing the induction of retinal disparity in the viewer by a device with which the two-dimensional image is viewed. With fusion of the retinally disparate images of the two-dimensional image, the viewer experiences the enhancement of his or her visual perception in the two dimensional image, which includes enhancement of depth perception and enhancement in clarity perception.

29 Claims, 9 Drawing Sheets

ENHANCEMENT OF VISUAL PERCEPTION

PRIORITY UNDER 35 U.S.C. §119(e) AND 37 C.F.R. §1.78

The present application claims the benefit of and priority from U.S. Provisional Application No. US60/685,737 entitled ENHANCEMENT OF DEPTH PERCEPTION filed on May 27, 2005.

CROSS-REFERENCE TO RELATED APPLICATIONS

U.S. Non-provisional application Ser. No. 11/033,186 entitled ENHANCEMENT OF DEPTH PERCEPTION filed on Jan. 11, 2005.

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

The field of the invention pertains to systems, devices, and methods for enhancing the visual perception of a viewer in a two-dimensional image, which includes enhancement of the viewer's perception of depth and clarity in a two-dimensional image. This field of invention is distinct from that of Garcia, U.S. Pat. No. 5,510,832: synthesized stereoscopic imaging from two-dimensional images. Garcia adequately discusses the utility and merits of simulation of 3D video from two-dimensional video sources. The field of the present invention is also distinct from that of Ashbey, U.S. Pat. No. 5,541,642: stereoscopic imaging with interlaced video through a lenticular decoder screen. Ashbey also discusses derivation of stereoscopic effects from a "monoscopic" source by simultaneously displaying successive frames of a motion picture with lateral displacement through his system.

The use of the terms "two-dimensional", "monoscopic", and "monocular" have been used in the prior art to distinguish the viewing of single images from that which is "stereoscopic"—the quality of vision with which a human viewer with two normal eyes and the ability for stereopsis sees a scene in physical (three-dimensional) space with objects at varying distances from the viewer. However, some clarification of these terms is necessary: the term "two-dimensional" as an adjective for the term "image" does not mean that the image does not represent a three-dimensional scene, i.e. a scene with visual cues for depth related to objects and surfaces at varying distances within the perspective of the scene; the term "three-dimensional" or "3D" as applied to an image does not necessarily mean that it is stereoscopic, but may also mean that it is an image displayed on a two-dimensional surface, flat or curved, and/or which may be manipulated so that the objects represented therein are viewable at different angles, either by rotation of the object or the variation in the angle of view with an apparent change in position of the viewer; the term "monocular", which literally means "having only one eye" or "with one eye" (in contrast with "binocular", meaning with two eyes), sometimes used as a synonym for "two-dimensional", is used to describe an image which appears to be displayed on a two-dimensional surface (as when a physical scene of objects at varying distance from the viewer is viewed with one eye), and is also used in the prior art terms "monocular cues" and "monocular depth cues" to describe certain aspects of a two-dimensional display of a three-dimensional scene which indicate the varying distances and angles of objects with reference to the view represented therein; the term "monoscopic" appears to be used in the prior art as a synonym for "monocular", particularly in Ashbey, but is not defined as such in common usage.

The subject of "depth perception of images on a television screen" has been discussed in LeMay, U.S. Pat. No. 5,488,510, but not the subject of depth perception in other types of two-dimensional images, such as posters, paintings, signs, still photographs, cinema, etc. LeMay uses a window screen type mesh in a device to be worn by a viewer through which a two-dimensional television image is viewed, and creates, according to its inventor, an "illusion". Unlike LeMay, the present invention, in its preferred embodiments, does not require any type of eye wear or worn device, and provides a natural stereo vision experience in the viewing of two-dimensional images of all kinds, including photographs, posters, drawings and paintings, signs, television and motion pictures, and projected images in general. Also, unlike LeMay, the present invention does not rely upon an "illusion", but enhances the viewer's perception of depth in the monocular depth cues and perception of clarity in a two-dimensional image.

The present invention should be distinguished from stereographic devices and methods providing stereoscopic vision which require simultaneous or alternated display of two images, still or motion picture, each image being of one of two monocular views, actual or stimulated, of a binocular view of a scene, which must be viewed with special viewing glasses or display lens; whereas the present invention involves the display of only one image, still or motion picture, of a single monocular view of the scene. It is to be noted that the stereo vision provided by the prior art is artificial in appearance as discussed in Garcia. Stereographic devices have been well known for many years, while the principle underlying the present invention, although not yet completely understood, is newly presented in this application.

The present invention should also be distinguished from the well-known effect that is observed with monocular viewing of a two-dimensional image with monocular depth cues against a featureless or flat background without such cues. The same effect can also be observed by monocular viewing of a two-dimensional image at the end of an enclosed space. With such a viewing the monocular depth cues in the two-dimensional image become pronounced, albeit seen with only one eye. Such monocular viewing, however, not only involves the discomfort of viewing with only one eye, but more importantly deprives the viewer of the accommodation reflex which occurs with binocular vision that gives the viewer the ability to accurately focus on the two-dimensional image. The result is that although, with such monocular viewing, the monocular depth cues in the two-dimensional image have an effect greater than if viewed binocularly, the two-dimensional image cannot be seen with the same degree of focus as if seen binocularly. The present invention operates very differently: the viewer's depth perception and perception of clarity in a two-dimensional image is enhanced by inducing a retinal disparity in the viewer that results in a fusion experience. With the present invention the two-dimensional image can be seen binocularly with the accurate focus of the accommodation reflex. Such accurate focus in turn heightens the fusion experience, and thus the enhancement of depth perception and perception of clarity afforded by the present invention.

The classification that applies to this aspect of the invention is generally in U.S. Class 359, "OPTICAL: SYSTEMS AND ELEMENTS", but the only subclass titles that provide a verbal similarity are 462, "STEROSCOPIC", and 478, "RELIEF ILLUSION", the descriptions of neither being applicable to the theory of operability of the present invention.

As previously indicated, the present invention provides enhanced perception of clarity for the viewer in a two-dimensional image. This effect became known during the testing of the depth perception enhancement effect from the assertions of many viewer-subjects that the two-dimensional images they viewed with the invention were "clearer" than without the system. Such an effect appears to have a basis in the notions of eye dominance and binocular retinal rivalry.

The enhancement of clarity of the present invention should be distinguished from eye wear, lens systems, and surgical procedures for gaining improved focus of images on the retina, which are all well-known. Distinction should also be made between the present invention and eye exercise systems, discussed extensively in Liberman, U.S. Pat. No. 6,742,892 (along with an informative tract on eye anatomy, function and optics), which are primarily concerned with the improvement of eye tracking, convergence and accommodation. It is presumed that U.S. Class 359, "OPTICAL: SYSTEMS AND ELEMENTS" may apply to this aspect of the invention as well. U.S. Class 351, "OPTICAL: EYE EXAMINING, VISION TESTING AND CORRECTION" may also apply.

SUMMARY OF THE INVENTION

The present invention provides enhancement of a viewer's visual perception in a single two-dimensional image, which includes enhancement of the depth perception of a viewer in various types of two-dimensional images that include monocular cues for depth, and thereby the experience of stereo vision in the viewing by such enhancement of the viewer's perception of those monocular depth cues. Such an enhancement is effected by the present invention with the induction of a slight but sufficient retinal disparity in the viewer's view of the two-dimensional image. Such a retinal disparity is experienced by a viewer with a normal capacity for stereopsis as the fusion of retinally disparate images which include the two-dimensional image, the "enhancement effect" of the present invention. That is, the present invention so enhances the viewer's perception of the monocular depth cues in a single two-dimensional image as to cause the viewer to experience the fusion of stereo vision. Also included in the invention is the enhancement of the "clarity" with which the viewer perceives a two-dimensional image, that is, the increase in resolution of the two-dimensional image as perceived by the viewer.

The present invention comprises the creation for the viewer of what is referred to herein as an enhanced scene which includes a single two-dimensional image. There are several ways in which such an enhanced scene may be created by the invention, examples of which are: 1) the placement in front of the two-dimensional image of a visually identifiable object; 2) the horizontal movement of the two-dimensional image on the surface upon which the two-dimensional image is displayed; and 3) the display and horizontal movement of a visually identifiable object, or an image of such, on or at the surface upon which the two-dimensional image is displayed. All of these ways may be effected mechanically, electronically, optically, or by computer programming, or by a combination of such means. The currently preferred way to create an enhanced scene is the first way stated above.

The creation of the enhanced scene within which the two-dimensional image is presented for viewing causes a retinal disparity in the viewer of the two-dimensional image. In the case of the preferred way, the retinal disparity is induced spatially, by reason of the viewer's binocular viewing of the enhanced scene, and is slight but sufficient to cause the viewer to experience the enhancement effect. In the other ways of creation of the enhanced scene, the retinal disparity is temporally induced, i.e. by the enhanced scene changing in time. The currently preferred visually identifiable object is a frame which surrounds the viewer's area of interest in the two-dimensional image. Such a frame may have other features, such as illumination, shape, and color, that can add to the enhancement effect by combination and/or control with reference to the qualities of the two-dimensional image and the viewer's vision.

The present invention comprises the creation for the viewer of what is referred to herein as an enhanced scene which includes a two-dimensional image. There are several ways in which such an enhanced scene may be created by the invention, examples of which are: 1) the placement in front of the two-dimensional image and of a visually identifiable object; 2) the horizontal movement of the two-dimensional image on the surface upon which the two-dimensional image is displayed; and 3) the display and horizontal movement of a visually identifiable object, or an image of such, on or at the surface upon which the two-dimensional image is displayed. All of these ways may be effected mechanically, electronically, optically, or by computer programming, or by a combination of such means. The currently preferred way to create an enhanced scene is the first way stated above.

The creation of the enhanced scene within which the two-dimensional image is presented for viewing causes a retinal disparity in the viewer of the two-dimensional image. In the case of the preferred way, the retinal disparity is induced spatially, by reason of the viewer's binocular viewing of the enhanced scene, and is slight but sufficient to cause the viewer to experience the enhancement effect. In the other ways of creation of the enhanced scene, the retinal disparity is temporally induced, i.e. by the enhanced scene changing in time. The currently preferred visually identifiable object is a frame which surrounds the viewer's area of interest in the two-dimensional image. Such a frame may have other features, such as illumination, shape, and color, that can add to the enhancement effect by combination and/or control with reference to the qualities of the two-dimensional image and the viewer's vision.

The system may include means for obscuring the edge of the two-dimensional image, where the edge of the two-dimensional image is sufficiently well defined to detract from the enhancement effect; and may also include a background mask for the enhanced scene to prevent the diminution of the enhancement effect by the visual environment in which the system is operating.

DETAILED DESCRIPTION OF THE INVENTION

Figure 1:
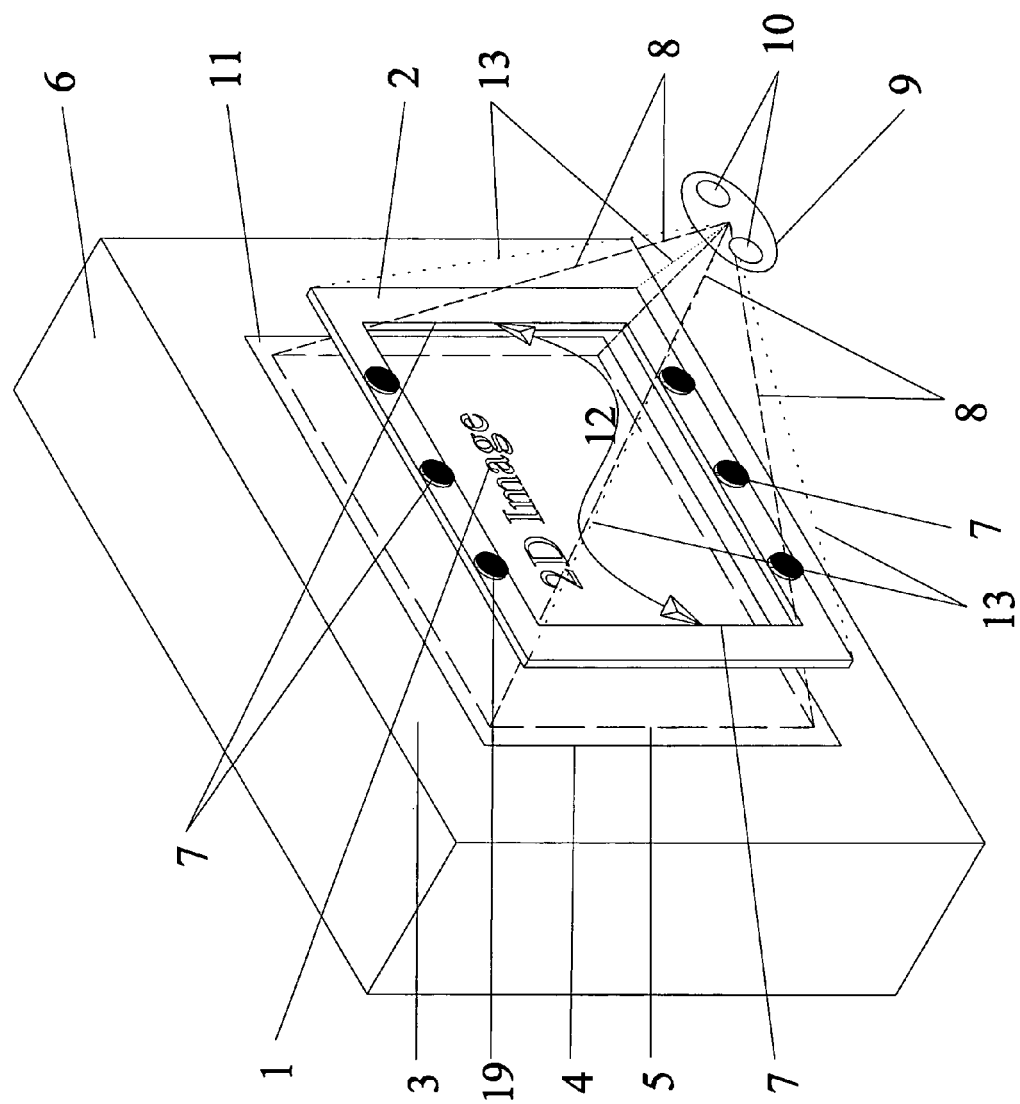
FIG. 1 is a perspective view of a mechanical embodiment of the system with a simple frame VIO.

The present invention provides a system, device within a system, and method for enhancing a viewer's visual perception in a two-dimensional image, which enhances the depth perception of a viewer in various types of two-dimensional images that include monocular cues for depth, and enhances the "clarity" with which the viewer perceives a two-dimensional image. The term "clarity" is used herein to mean the resolution with which the two-dimensional image is perceived by the viewer, and not the focus of the two-dimensional image. The effect of these enhancements shall hereinafter be referred to as the "enhancement effect". However, the enhancement effect being twofold, the aspects thereof shall be referred to as the "depth perception enhancement effect" and the "clarity enhancement effect" when the distinction is necessary. Otherwise, the term "enhancement effect" should be understood to mean either or both, depending on the context.

The present invention is described herein as a "device within a system", rather than simply a "device", because the device that is employed receives its identity and function according to an interactive relationship with the other elements of the system and/or the visual system of a viewer. The term visual system shall be taken to mean the human visual system, including the eyes and all of their internal structures, the optic nerves, all neural structures associated with all other functions of eye movement, protection, or control; and all neural structures by which data collected by the eyes is processed, recorded and interpreted, including the human brain, particularly the visual cortex.

As a foundation for understanding the invention and the nature of the enhancement effect, the following generally accepted definitions and principles related to the human visual system and visual perception may be considered:

1. Binocular visual field: region of overlapping visibility for the two eyes.
2. Point of Fixation (Point of Regard): Point or object on which the eyes are directed and one's sight is fixed.
3. Fovea: Point on the retina on which are focused the rays coming from an object directly regarded, i.e. from the point of regard.
4. Monocular depth cues: Visual cues which present information about the relative location of objects using one eye, which include: occlusion or interposition; aerial perspective (atmospheric perspective, aerial haze); linear perspective (convergence of parallel lines); relative height; texture gradients; shading and light; relative size; relative motion (monocular movement parallax); and familiar size.
5. Retinal disparity: Differences between two or more images projected on the retina of the eye with reference to the fovea of the retina.
6. Fusion: Neural process commonly referred to as stereoscopic vision (or stereo vision) thought to occur in the visual cortex that brings two retinal images to form a single image which is known as the single cyclopean image.
7. Panum's fusional region (Panum's fusional space): Region in visual space over which humans perceive binocular single vision derived from the fusion of binocular retinal images. (Outside Panum's fusional region physiological diplopia occurs.)
8. Panum's fusional area: Area on the retina of one eye, any point on which, when stimulated simultaneously with a single specific slightly disparate point in the retina of the other eye, will give rise to a single fused image.
9. Retinally disparate points: Retinal points which can give rise to different principal visual directions, which, when within Panum's fusional area (zone of single binocular vision), can be fused resulting in single vision.
10. Retinally disparate images: Retinal images which are comprised of retinally disparate points.
11. Retinal disparity: The difference in the retinal images that results from retinally disparate points of retinal images detected in the visual cortex which, if within Panum's fusional area (zone of single binocular vision), can be fused resulting in single vision.
12. Stereopsis: Ability to perceive depth produced by retinal disparity within Panum's fusional area requiring properly functioning binocular cells thought to exist in the visual cortex: the ability to distinguish the relative distance of objects resulting from the lateral displacement of the eyes that provides two slightly different views of the same object (disparate images).
13. Binocular retinal rivalry: Alternating suppression of the two eyes resulting in alternating perception of the two retinal images.

With respect to depth perception enhancement, the present invention provides a viewer who has the capacity for stereopsis with the experience of stereo vision in the viewing of a single two-dimensional image, hereinafter referred to as the "2D image", by enhancing the viewer's perception of depth in the monocular depth cues in the 2D image. That is, the depth perception enhancement effect of the present invention so enhances the viewer's perception of the monocular depth cues in a single two-dimensional image as to cause the viewer to experience the fusion of stereo vision with respect to the content of that 2D image. With respect to the clarity enhancement, the present invention provides a viewer who has the capacity for stereopsis with enhancement of the viewer's perception of clarity in viewing a 2D image, even without the presence of monocular depth cues therein. Such enhancements are effected by the present invention with the stimulation of a slight but sufficient retinal disparity on the Panum's fusional area of the viewer. A retinal disparity is experienced by a viewer with a normal capacity for stereopsis as the fusion of binocular views of the 2D image when viewed with the present invention. The theoretical foundation for the clarity enhancement effect also resides in the phenomena of eye dominance in humans, i.e., the dominant eye more strongly contributes to binocular vision than the other, and is said to be the eye that looks directly at an object; and the phenomena of binocular retinal rivalry, i.e., alternating perception of the two retinal images—indicating that the retinal image from only one eye at a time is being neurally recorded in the visual cortex. If it is the fusion of slightly disparate retinal images in the visual cortex that provides the experience of stereo vision, then a diminution of the strength of one of such images in the visual cortex must diminish the experience. Therefore, if one eye is more dominant, greater viewer attention to binocular vision, with consequently greater contribution by the non-dominant eye, may be required for a full perception of binocular cues. In ordinary viewing of a 2D image (without the use of the present invention) the viewer's attention in the 2D image is probably relaxed, because no significant retinal disparity results from the viewing of a 2D image directly, that is, along a line-of-sight which is substantially perpendicular to the 2D image. Such relaxation in attention appears to decrease the contribution that the retinal image from the non-dominant eye makes to the single cyclopean image (said to be the result of the fusion of the two retinal images in the visual cortex). However, greater attention in a two-dimensional image seems to occur with the use of the present invention and the consequent greater contribution to the cyclopean image by the non-dominant eye. This greater contribution by the retinal image of the non-dominant eye is a product of and carries with it the stimulus of the rods and cones of the non-dominant eye, thus increasing by as much as two-fold the number of stimulus points contributing to the cyclopean image with fusion of the retinally disparate images in the visual cortex. With such an increase in stimulus points being fused in the visual cortex, the resolution of the cyclopean image in the visual cortex is increased, and thus the increase in the "clarity" of the two-dimensional image experienced by the viewer, the clarity enhancement effect.

The system is here exemplified in various embodiments: mechanical (static and dynamic), electromechanical, electrical, electronic, optical, and by computer programming. All of the embodiments are designed to produce the enhancement effect for the viewer of a 2D image by a fusion experience resulting from the viewing of an "enhanced scene", hereinafter referred to as such, that includes the 2D image and the device within the system, the viewing of which causes a retinal disparity in the viewer.

In the various embodiments of the invention such retinal disparity may be spatial and/or temporal: spatial retinal disparity resulting from creation of retinal images with different eye locations, as where an enhanced scene includes mechanical elements spatially arranged with the 2D image and is viewed binocularly (with separation of the viewer's eyes); temporal retinal disparity resulting from the creation of retinal images at different times, as when an enhanced scene changes over time with the motion of its elements and/or motion of the viewer's eye.

Figure 2:
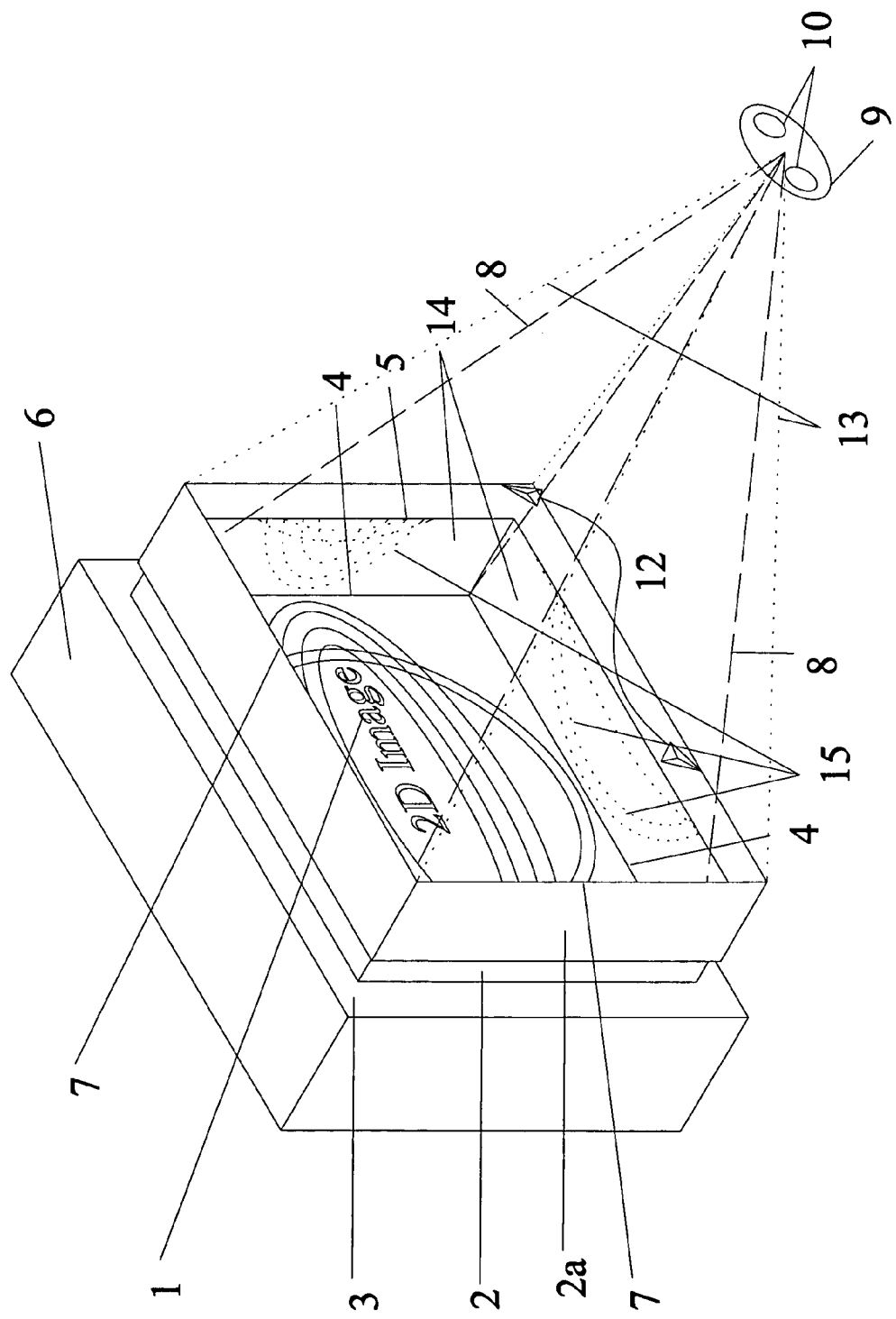
FIG. 2 is a perspective view of a mechanical embodiment of the system with a hood-frame VIO with integrated edge obscuring.
Figure 3:
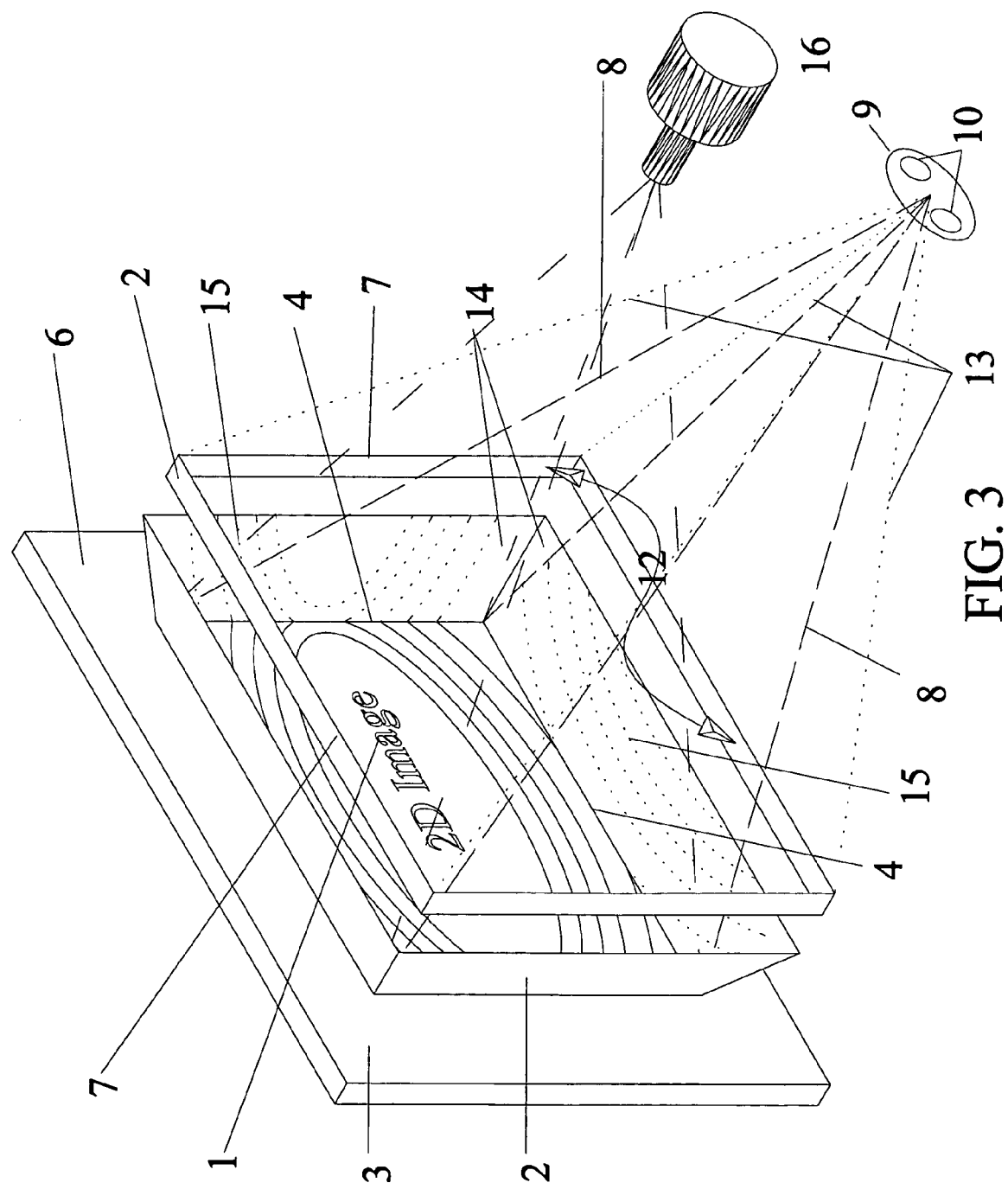
FIG. 3 is a perspective view of a mechanical embodiment of the system for front projection with a simple frame VIO and separate edge obscuring.

The present invention and its underlying principle may be understood with reference to the drawings of the fundamental embodiment, also referred to as Embodiment No. 1, which is the static mechanical embodiment shown in FIGS. 1–3. The fundamental embodiment is referred to as such for the reason that the enhancement effect is attained with the operative parts of the system at rest (not in motion), and is operative with all types of 2D images. FIGS. 1–3 show different examples of the fundamental embodiment, with FIG. 1 showing the simple frame example, FIG. 2 showing the hood-frame example, and FIG. 3 showing the projection example.

In the various drawings it should be noted that the reference numerals for certain elements of the system are the same throughout the drawings where the function of such elements remains the same.

The 2D image 1 is referred to as such because it is substantially representable using coordinates of only two dimensions, regardless of the shape of the image surface 3, such as on an embossed surface, having a discernable texture, or the surface of a relief. The 2D image may be of any kind, including photographs, posters, drawings, paintings, signs, television and computer images; and all forms of front and rear projection images, film or electronic, both still and motion; however viewed, either directly or by other means; or whether generated or displayed mechanically, optically, or electronically. The term "2D image" as used in this disclosure may represent a three-dimensional scene, which is a scene with one or more monocular depth cues related to objects and/or surfaces at varying apparent distances from the viewer. A 2D image need not have any monocular depth cues in order for it to be viewed with the clarity enhancement effect; but in order to be viewed with the depth perception enhancement effect where not representing a three-dimensional scene, the 2D image must have at a minimum some monocular depth cue, even if only contrived for that purpose. The term "monocular", which literally means "having only one eye" or "with one eye", is not used in this disclosure as a synonym for "two-dimensional" as used in the term "2D image", and is specifically excluded from the meaning of "2D image" as used in this disclosure. However, the common meaning of "monocular" is used in this disclosure to describe an image of a physical scene of objects at varying distance from the viewer when viewed with one eye (and thereby may appear to be displayed on a two-dimensional surface), as well as with reference to "monocular cues" or "monocular depth cues".

The surface upon which a 2D image is presented shall be referred to as the "image surface" 3, which may be flat, faceted, horizontally and/or vertically curved, spherical, some other shape, or as previously discussed herein, and may be a surface which is not associated with a solid physical object, such as a sheet flow, spray of liquid, or cloud of vapor; or may be a surface defined by the 2D image in physical space not associated with any physical object at all.

For the purpose of this disclosure the term "horizontal", as referred to in all its derivative forms as well (such as "horizontally" as used hereinabove), shall mean a direction substantially parallel to the orientation of the viewer's eyes, i.e. in the direction of the line joining the center of the viewer's eyes, even though not horizontal in relation to the earth's surface; or the direction of a component of the distance vector between two points in space (from the vector representation of location, wherein the distance vector of a location is resolved into two component distance vectors at right angles, the magnitude of the resolved vector being the magnitude of the hypotenuse of the right triangle formed by the resolved distance vector with its components), which is substantially parallel to the orientation of the viewer's eyes.

An object 6 upon which an image surface 3 may be displayed or otherwise exist shall hereinafter be referred to as the "image object" 6, and may be solid, liquid or gaseous.

Referring to the examples of the fundamental embodiment shown in FIGS. 1–3, the system for enhancement of visual perception includes a 2D image 1 which is displayed on an image surface 3, and a device within the system, which shall hereinafter be referred to as an "enhancer". In the case of the fundamental embodiment shown in FIGS. 1–3, the enhancer is a visually identifiable object, hereinafter referred to as a "VIO" 2, which is a physical object that is placed in front of the 2D image 1 (and thus in front of the image surface 3), visually discernable by the viewer as a distinct entity substantially separate from the 2D image 1, and not masked by confusion with the content of the 2D image 1 behind it. "In front" of the 2D image 1 means the side of the image surface 3 from which the 2D image is viewed by the viewer 9, and before and within the view 8 of the viewer 9 of the enhanced scene 13, regardless of the orientation of the image surface 3, but not necessarily between the 2D image 1 and the viewer 9. Thus, a VIO "in front" of the 2D image does not imply that any part of a 2D image is blocked from the viewer's view by the VIO. The VIO 2 should be located within Panum's fusional region, so as to present an enhanced scene 13 of those elements to the viewer 9. The preferred location of the VIO 2 is in the boundary space of Panum's fusional region: the space within Panum's fusional region where the distance from the 2D image is significantly greater than the distance from the boundary of Panum's fusional region in front of the 2D image. The VIO 2 may be opaque, translucent, transparent, or transparent with distortion. The preferred VIO 2 should have a clearly defined boundary 7 which can be readily focused upon when viewed by the viewer 9. The VIO 2 may obscure a part 11 of the 2D image 1 to the viewer, surround an area which includes the 2D image 1, or surround all or part of the 2D image 1. It is preferable that the VIO 2 in front of the 2D image 1 be substantially within the depth of field of the viewer 9, i.e. substantially in focus for the viewer's 9 eyes 10 as they are focused on the 2D image 1, so that the entire enhanced scene 13 is also substantially in focus for the viewer 9. The placement of the VIO 2 should be such that the clearly defined boundary 7 of the VIO 2 nearest to the viewer 9 is a sufficient distance away from the 2D image 1 to render two slightly disparate images of the enhanced scene 13 in the binocular view 8 of the viewer, one on the retina of each of the viewer's 9 eyes 10 and in the Panum's fusional area of the viewer. Thus the location of the VIO 2 should be, together with the 2D image 1 in the enhanced scene 13, substantially within the Panum's fusional region, preferably within the boundary space of Panum's fusional region, so that corresponding points of the enhanced scene 13 are projected on the Panum's fusional area of the viewer's 9 eyes 10 and generate a fused cyclopean image of the enhanced scene 13 in the viewer 9. Such a fused cyclopean image of the enhanced scene 13 in the viewer 9 gives the viewer 9 the experience of stereo vision, not simply by distinguishing distance between the 2D image 1 and the VIO 2, but within the 2D image 1 itself, by enhancing the viewer's perception of depth in the available monocular depth cues within the 2D image 1.

The invention is designed to be effective to enhance depth perception and/or clarity perception in a 2D image for a viewer who has two eyes and a relatively normal ocular and neural capacity for stereopsis. However, the intensity of the enhancement effect will vary with the level of such capacity in the viewer. In this respect the invention may also serve as an experimental probe for the phenomena of visual perception, both binocular and monocular.

The experience of stereo vision provided by the present invention is superior to the prior art in that the cyclopean images experienced with the present invention do not suffer from the defects described in the prior art, but are as natural as normal stereo vision to the viewer. The experience is natural because the experience is with the viewer's own eye separation and capacity for stereopsis.

A VIO may have any shape, and may also be made to be adjustable between flat, and horizontally and/or vertically curved. The placement of a VIO may be by any means, such as suspension in position or attachment to the image object 6, fixed or adjustable with respect to distance from and angle with the image surface 3.

In an enhanced scene a VIO is operably associated with the image surface by a spatial relationship with and proximity to the image surface in order to produce the enhancement effect. Such status of a VIO is also intended to mean herein that the VIO is not physically connected to or with the viewer, either by attachment to or being worn by the viewer.

Different types of VIO may be used effectively, depending on the application for the invention. For example, a VIO may be a vertically oriented rod or tube, placed to the side and in front of the image surface; or may be a group of medallions strung above and in front of the image surface. The VIO may be a grid between the viewer and the 2D image with wide enough spacing between visible grid elements to minimize interference with the viewing of the 2D image. However, because the VIO must be clearly present to the viewer as an integral part of the enhanced scene, the use of a grid as the VIO would probably interfere with the viewer's appreciation of the content of the 2D image as an entirety. Where the viewer's "area of attention" 5 in the 2D image 1 is less than the entire 2D image 1, a VIO 2 may be designed that is effective for that area of attention 5, such as a frame about the area of attention 5, which may partially obscure the rest of the image area, which shall hereinafter be referred to as a "VIO/frame" 2, examples of which are shown in FIGS. 1–3. The term "area of attention" 5 is used here to mean the whole or part of a 2D image 1 that a viewer is focused upon and includes the viewer's 9 point of fixation. Such a VIO/frame 2 may be limited to a sufficient size to substantially bound the area of attention 5 for the viewer at a particular distance from the 2D image 1, so that no well defined edges 4 of the 2D image 1 are available to the view 8 of the viewer 9, as shown in the example of FIG. 1.

Where the viewer's appreciation of the entire image is practically or aesthetically necessary, the preferred VIO/frame 2 is one that completely or partially surrounds the entire 2D image 1, with an aperture 12 that does not severely crop the 2D image 1 to the viewer 9. Such a VIO/frame 2 may have an adjustable aperture 12 in order to compensate for the viewer's 9 viewing position relative to the 2D image 1, the viewer's 9 angle of view, the shape of the image surface 3, the size of the 2D image 1, and the distance of the viewer 9 from the 2D image 1. An adjustable aperture 12 may also be moved horizontally within the structure of a VIO/frame 2 for the purpose of intensification of the enhancement effect.

As indicated with respect to a VIO/frame which restricts the view of a viewer to a specific area of attention, the visibility to the viewer of well defined edges of a 2D image tends to announce the 2D image as flat in the space in front of the viewer, in contrast to other binocular cues within that viewing environment, and thus detracts from the enhancement effect. This tendency shall hereinafter be referred to as the "edge effect". The edge effect can be diminished by the diminution of the visibility of the edge of a 2D image, which shall hereinafter be referred to as "edge obscuring". A device employed to accomplish edge obscuring shall be referred to as an "edge obscuring" device.

A VIO/frame 2 may be a simple frame, as shown in FIGS. 1 and 3, or hood-like as shown in FIG. 2 with edge obscuring panels 14 producing a reflection 15 of part of the 2D image 1 toward the viewer 9. Such a hood-like VIO/frame 2 may also incorporate a telescoping section 2*a* which can be used to adjust the distance between the 2D image 1 and the visually identifiable boundary 7 of the VIO/frame 2. A simple VIO/frame 2 may be used with separate edge obscuring panels 14 as shown in FIG. 3, where the 2D image 1 is produced on an image surface 3 by a projector 16 on an area bounded by edge obscuring panels 14, or integrated with edge obscuring panels.

Figure 9:
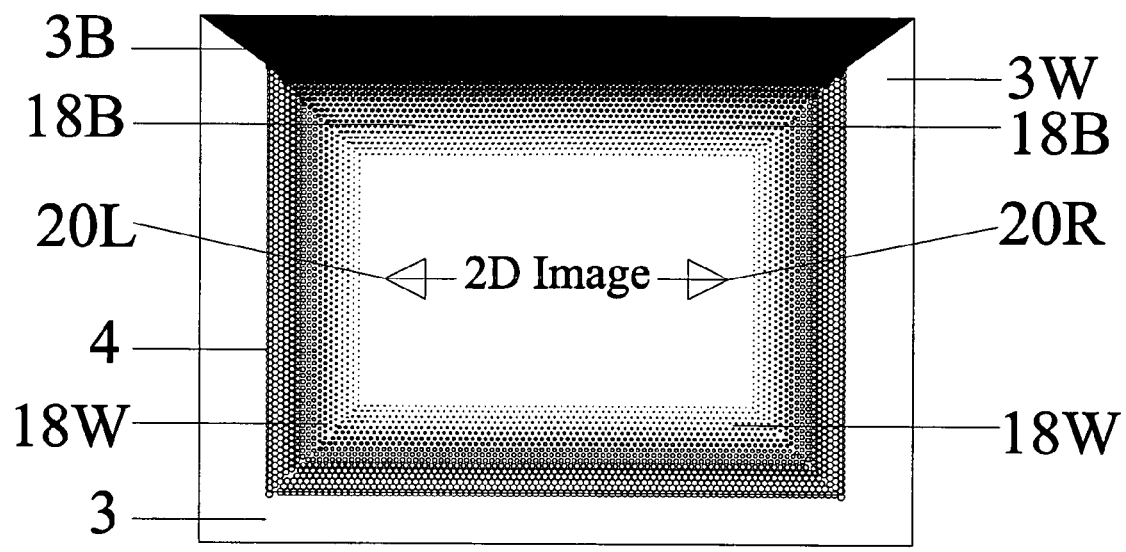
FIG. 9 is a schematic diagram of horizontal image movement with edge obscuring.

As indicated earlier, the VIO 2 may also be itself an edge obscuring device by obscuring the edges 4 of the 2D image 1 from the immediate view 8 of the viewer 9, as in the case of a VIO/frame 2 shown in FIG. 1, where the edges 4 of the 2D image 1 are cropped by the aperture 12 of the VIO/frame 2. However, also as earlier indicated, the VIO/frame 2 may also be in the form of a hood around the 2D image 1 as shown in FIG. 2, in which the edge obscuring panels 14 are reflective and a part of the hood VIO/frame 2. Indeed, obscuring the edges of a 2D image may be accomplished by various means that are integrated with or independent of the VIO, and are included in the invention. Thus an edge obscuring device may also operate as an enhancing device in the same manner as a VIO. With respect to the fundamental embodiment, various means may be employed to obscure the edge of the 2D image 1 using the light from the 2D image 1. In the example of the projection system shown in FIG. 3, the 2D image 1 can be bounded at one or more of its edges 4 by edge obscuring panels 14 as in the example of FIG. 2, so that light from the 2D image 1 near an edge 4 is wholly or partially reflected or transmitted toward the viewer 9. Such an edge obscuring panel 14 may have other optical qualities that diffuse or distort light reflected from the 2D image 1 in order to more smoothly obscure the edge of the 2D image 1. The 2D image 1 may also be similarly bounded by edge obscuring panels 14 which are translucent or transparent, with internal light transmitting properties, that similarly diffuse and distort the light from the 2D image 1. The edge 4 of the 2D image 1 can also be obscured by being bounded at one or more of its edges 4 by a light source distributed along the edge 4. Another means of edge obscuring is shown in FIG. 9: the edge obscuring mask (or image) 18B, 18W (B and W indicating Black and White colored patterns respectively), which can be attached to or displayed on the image surface 3 along the edge 4 of the 2D image 1 to diffuse or break up the viewers view of the edges 4 of the 2D image 1. The preferred edge obscuring mask 18B, 18W is one that is transparent with a pattern printed on it, where the pattern may be either opaque, transparent, translucent, or a combination thereof. Such a pattern would probably be most effective if it is most dense at the edge 4 of the 2D image 1, with a gradual diminution of the density of the pattern from the edge to the interior of the 2D image 1, as shown in FIG. 9: the series of dots of a color close to that of the color of the image surface 3 bordering the 2D image 1, that are most densely packed on the edge obscuring mask (or image) 18B, 18W near the edge, so as to be almost solid, diminishing to zero in size and packing density toward the interior boundary of the mask. Another form of pattern would obscure the edge of the 2D image 1 not only by variation in density from outer to inner boundary, but also by its variation in coloration (other than black and white) which would change in appearance as the image shines through or upon it. Many such patterns are possible, the suitability of which may vary with the viewer's visual ability and taste, and there is no intent to have this disclosure limit the invention to any particular type of pattern.

In the case of front- or rear-projected 2D images, film or electronic, an edge obscuring image, such as shown in FIG. 9 as 18B, 18W, may be combined with the 2D image 1, so that the display includes an image which effects edge obscuring. This may be accomplished by superimposing an electronically generated edge obscuring image on the 2D image in simulation of a transparency with a pattern as described above: either by including the edge obscuring image on the film print, in the case of film projection, or combining an electronically generated edge obscuring image with the 2D image for display. Such electronically generated edge obscuring images may be static and of various design, or dynamic, changing with time in design, size, color, frequency, etc. to intensify the enhancement effect as the nature of the 2D image may require.

The image obscuring in the form shown in FIG. 9 may be practiced independently of Embodiment No. 3, and may be practiced with the fundamental embodiment and Embodiment No. 2.

Again referring to FIG. 9, another form of mask (not shown in FIG. 9) for obscuring the edge 4 of the 2D image 1 can be affixed at the edge 4 of the 2D image 1 on that part of the image surface 3 that surrounds the 2D image 1. Such a mask may have an edge obscuring pattern printed on it similar to the series of dots for the mask 18B, 18W on the 2D image 1, but with a background close to the 2D image 1 in color, such a pattern being most densely packed on the mask furthest from the edge 4 of the 2D image, diminishing to zero in size and packing at the edge 4 of the 2D image 1.

As with the edge effect, detraction from the enhancement effect may also occur with the "background effect": the spatial contrast between the enhanced depth perception in the viewing of a 2D image and the scene of objects in the region of physical space within focus behind or beside the 2D image. Such a spatial contrast also occurs when the relatively confined region of space behind the 2D image is not greatly out of focus and contains easily visible and distinguishable objects that are distributed therein. Large spaces behind the 2D image with objects distributed therein that are not easily focused upon when viewing the 2D image do not tend to provide the spatial contrast of the background effect. That tendency is similarly avoided when the 2D image is displayed against or a short distance in front of a relatively flat wall, or a background with random textures, regular patterns, or visually indiscernible objects. Indeed, a means for the defeat of the background effect is thus suggested, which shall be referred to as "background masking": a mechanical or optical background for the enhanced scene to prevent the diminution of the enhancement effect by the visual environment in which the system is operating, which effects the conditions that avoid the spatial contrast of the visual environment with the enhanced scene.

The enhancement effect may be intensified and/or maintained by illumination of the VIO for the viewer from the front, back, or internally, or where the VIO is itself in whole or in part an illuminating device. Illumination of the VIO may also be derived from the light emitted or reflected by the 2D image, in the case of video display or projection, using light transmitting or reflecting panels. The illumination of the VIO may be of various colors and intensities, and/or may be polarized; and the color, intensity and/or polarization of the illumination may be variable over time. Such variation in the illumination may be programmably controlled with reference to the characteristics of the 2D image, such as brightness, coloration, resolution, shape, program material, monocular depth cues, etc.; and/or controlled with reference to the characteristics of the viewer's vision.

Intensification of the enhancement effect may be achieved with a graphic pattern 19 visually discernable by the viewer 9 being applied to a surface of the VIO 2 which faces the viewer 9, as shown in FIG. 1, and is particularly effective when placed on the most horizontal sides of a rectangular VIO/frame 2. The pattern itself may be illuminated, a graphic directly applied to the VIO 2, illuminated or otherwise, integrated with the illumination of the VIO, or applied to interrupt the illumination of the VIO 2 by blocking certain parts of such illumination of the VIO 2 to the viewer's 9 view. The pattern may be a group of VIOs arranged for the purpose, or a group of VIOs may be arranged to form such a pattern. Such a pattern may also operate to distribute the enhancement effect over the viewer's area of interest 5.

Where the 2D image is not produced on an illuminating device, such as a television monitor, light box, or projection screen, the enhancement effect of the system and device may also be improved by illumination of the 2D image. Such illumination of the 2D image may be from sources attached to or independent of the VIO, and may be controlled in a manner similar to the illumination of the VIO.

All of the various attributes of the 2D image and the VIO may be combined and controlled to accommodate the position and vision characteristics for the viewer and to intensify and/or maintain the enhancement effect with respect to the various characteristics of the 2D image; and the entire range of such combination and control is included in the invention. Such control of the system may also be programmed to achieve specific effects in the 2D image, and/or associated with the generation of the 2D image, such as a broadcast signal, or on a recorded track, such as videotape, compact disc, digital video disk, digital video recorder, or on a motion picture film. Such programming may even be composed for presentation of the entire range of 2D images with which the system may be practiced, preexisting as well as contemporary with the composition.

The method for enhancement of visual perception of the present invention, which the system and device of the present invention are designed to practice, may include the creation for the viewer of an enhanced scene. The method may therefore involves the selection of the elements of the enhanced scene: the 2D image which is the subject of the enhanced scene; the surface upon which it is to be displayed, and the enhancer. For depth perception enhancement, it is necessary that the 2D image have monocular depth cues, but such monocular depth cues are not necessary for clarity enhancement. Among the monocular depth cues to be considered in the selection for depth perception enhancement of a 2D image as the subject of an enhanced scene are occlusion or interposition, aerial perspective, linear perspective, relative height, texture gradients, shading and light, relative size, relative motion, and familiar size. In addition to monocular depth cues, other characteristics of the 2D image may be considered in the analysis, such as the inherent clarity of the 2D image, the level of illumination depicted within the 2D image, the number of objects in the 2D image, the similarity of objects in the 2D image, the randomness or order of the objects in the 2D image, and the inherent resolution of the 2D image; and, in the case of moving 2D images, the steadiness of the 2D image, the rapidity of movement within the 2D image, the duration of the cuts (the period of uninterrupted action) in the 2D image, and the length of time that monocular depth cues exist uninterruptedly in the scenes of the 2D image. The method may also include the taking into consideration of the size of the 2D image, the distance of the viewer from the 2D image, and the angle from which the 2D image is being viewed. The 2D image is then presented on an image surface selected for the 2D image. One or more enhancers to be used with the 2D image as displayed (its type, size, etc.), and its mode of operation (coloration, illumination, motion, programming, etc.) may then be selected for the desired enhancement effect. If the enhancer is a VIO, it is preferred that it be operably associated with the image surface upon which the 2D image is displayed. The VIO together with the 2D image presents an enhanced scene to a viewer's visual system as an image on the retina of each eye of the viewer with a spatial retinal disparity. The other possible enhancers include a configuration of standard electronic, optical and/or mechanical components which moves said two-dimensional image horizontally with respect to a viewer's point of fixation on the image surface; and/or generates a horizontally moving two-dimensional image of a visually identifiable object at or on the image surface which is seen by the viewer with said 2D image. If one or more of the enhancers is a VIO, the visual system of the viewer of the 2D image is caused by the constitution of the enhanced scene to be subjected to a slight but sufficient spatial retinal disparity in the retinal images of the 2D image detected by the viewer's visual system: if one of the other enhancers is used, the viewer of the 2D image is caused to be subjected to a slight but sufficient temporal retinal disparity in the retinal images of the 2D image. The viewer is thus caused to experience a single fused cyclopean image, a single vision resulting from a fusion of the retinally disparate images, in which the viewer' perception of depth in any monocular depth cue in the 2D image may have is so enhanced as to be experienced as a form of stereo vision, and in which the viewer's perception of clarity is so enhanced as to be experienced as an increase in resolution of the 2D image.

The criteria for the analysis of the 2D image that is to be performed in conjunction with the method described above may be included in a rating system for 2D images the purpose of which is to inform the viewer and the parties involved with the presentation of the 2D image as to the level of qualification of the 2D image for the enhancement effect that may be expected with the present invention. Such a rating system may quantify the criteria used to rate the 2D image, and report the results thereof in a numerical, verbal, graphic, and/or summary form. The ratings thereby generated may also be used by the parties having a proprietary interest in the content of the 2D image to market same and to qualify for the use of the present invention.

With the understanding of Embodiment No. 1, the fundamental embodiment, the other following described basic embodiments will be seen to also employ the essential elements:

Embodiment No. 2: Electronic generation of a 3D VIO for a stationary 2D image.

Embodiment No. 3: Electronic or mechanical horizontal movement of the 2D image relative to the image surface.

Embodiment No. 4: Electronic or mechanical horizontal movement of a 2D VIO image relative to the image surface for a stationary 2D image.

Embodiment No. 5: Horizontal movement of a mechanical VIO at the image surface for a stationary 2D image.

Embodiment No. 6: A computer program operating in a computer to provide horizontal movement of a 2D image relative to the image surface and/or horizontal movement of a 2D VIO image relative to the image surface for a stationary 2D image.

Other embodiments are possible by various combinations of these with each other, including the fundamental embodiment, and with edge obscuring and/or background masking.

Embodiments 2 through 5 may be practiced with enhancers which are various configurations of standard components: devices which are well known for the purpose for which they are designed and fabricated. Such devices are comprised of standard signal processing circuitry that generates, combines, modifies, and extracts the signals for the 2D image and the accessory images of which Embodiments 2 through 5 are comprised. A configuration of standard components is a utilization of standard components by combination in a relationship and/or connection to achieve an operation to which each contributes according to its respective purpose. However, the operations performed by the configurations of standard components disclosed herein do not appear to be known in the prior art. Embodiment No. 6, however, is practiced with a computer program operating in a computer which itself generates and/or displays the 2D image which is enhanced by the operation of the computer program itself in the generation and/or display of the 2D image, such enhancement including the elements of horizontal movement of the 2D image and/or horizontal movement of a one or more 2D VIO images in the same way as in Embodiments Nos. 3 and 4.

Figure 4:
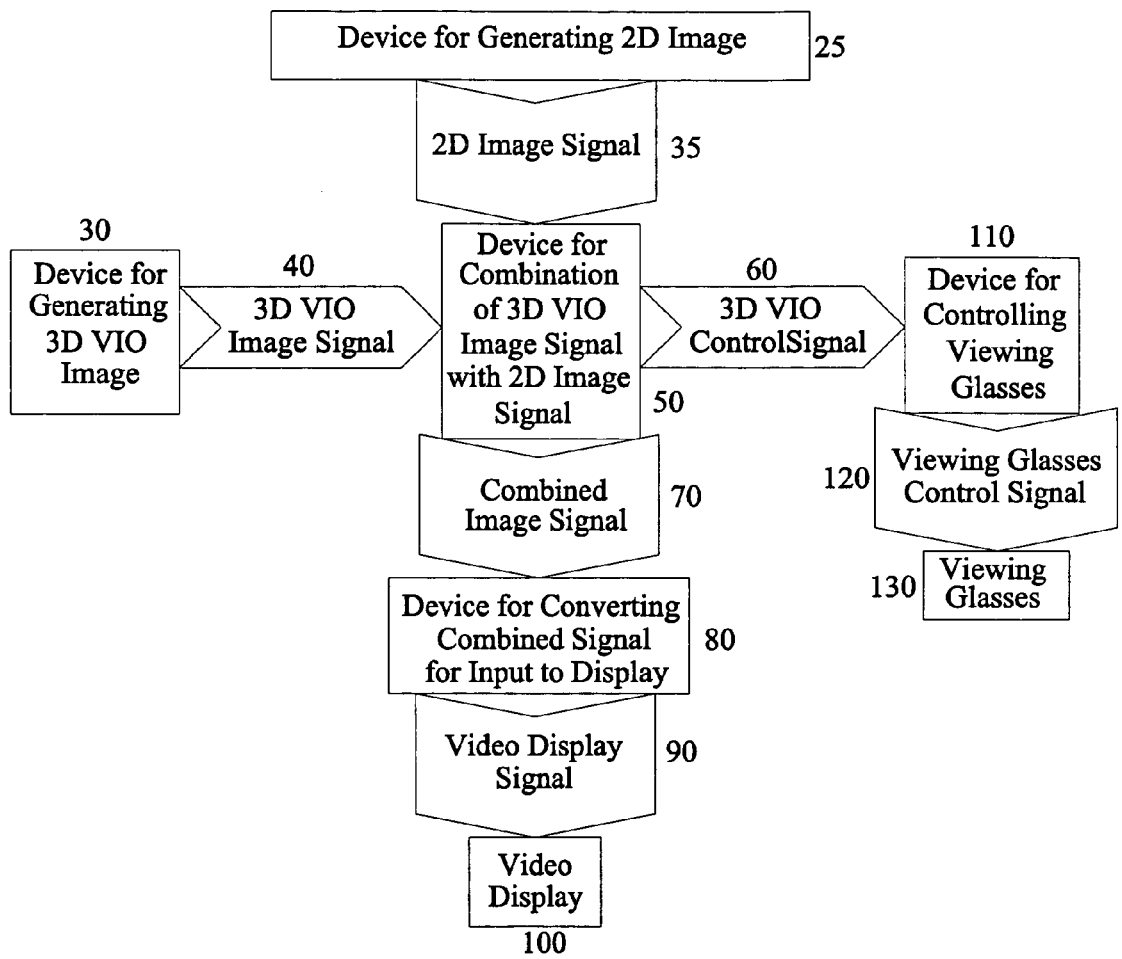
FIG. 4 is a block diagram of a first example of the system utilizing an electronically generated virtual 3D VIO.
Figure 5:
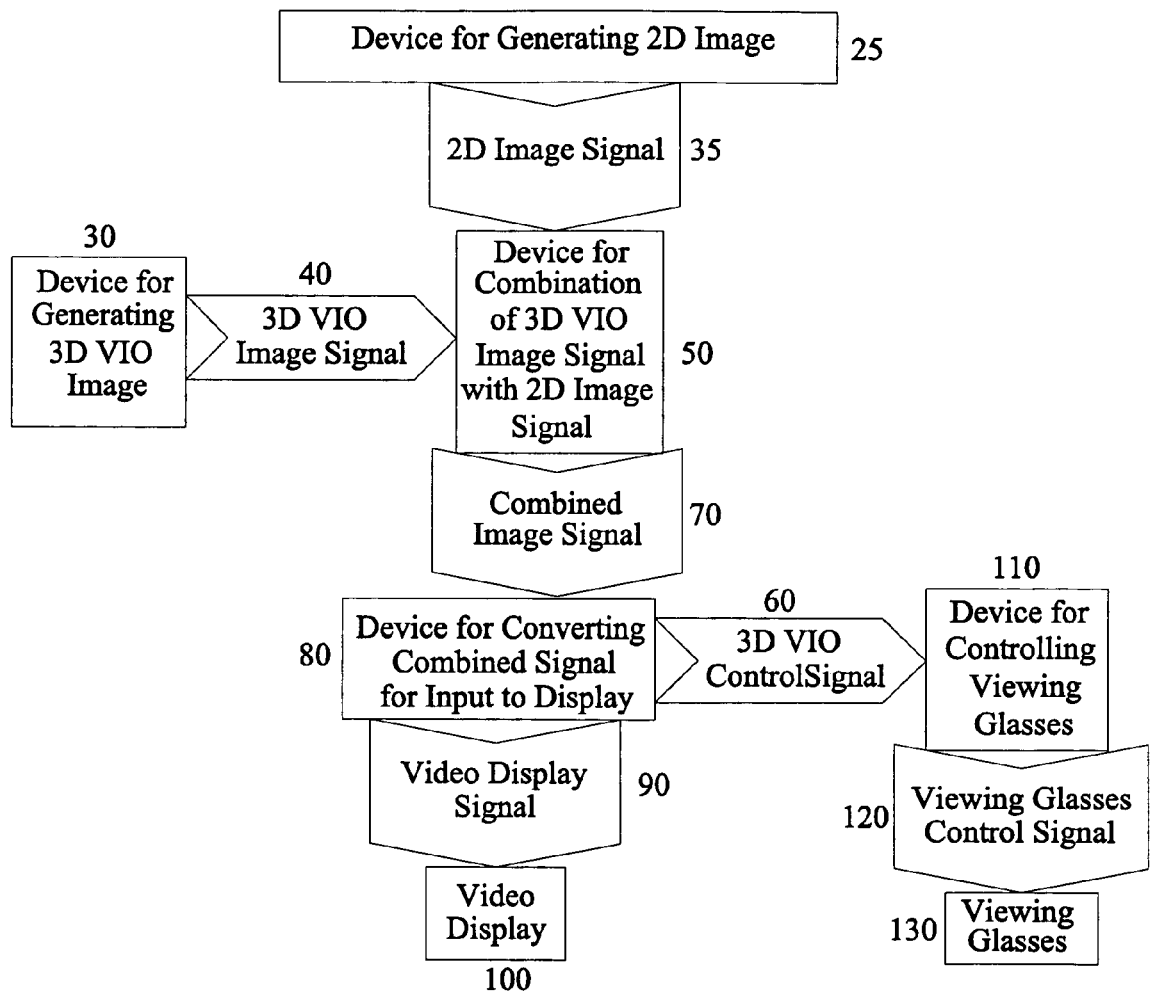
FIG. 5 is a block diagram of a second example of the system utilizing an electronically generated virtual 3D VIO.
Figure 8:
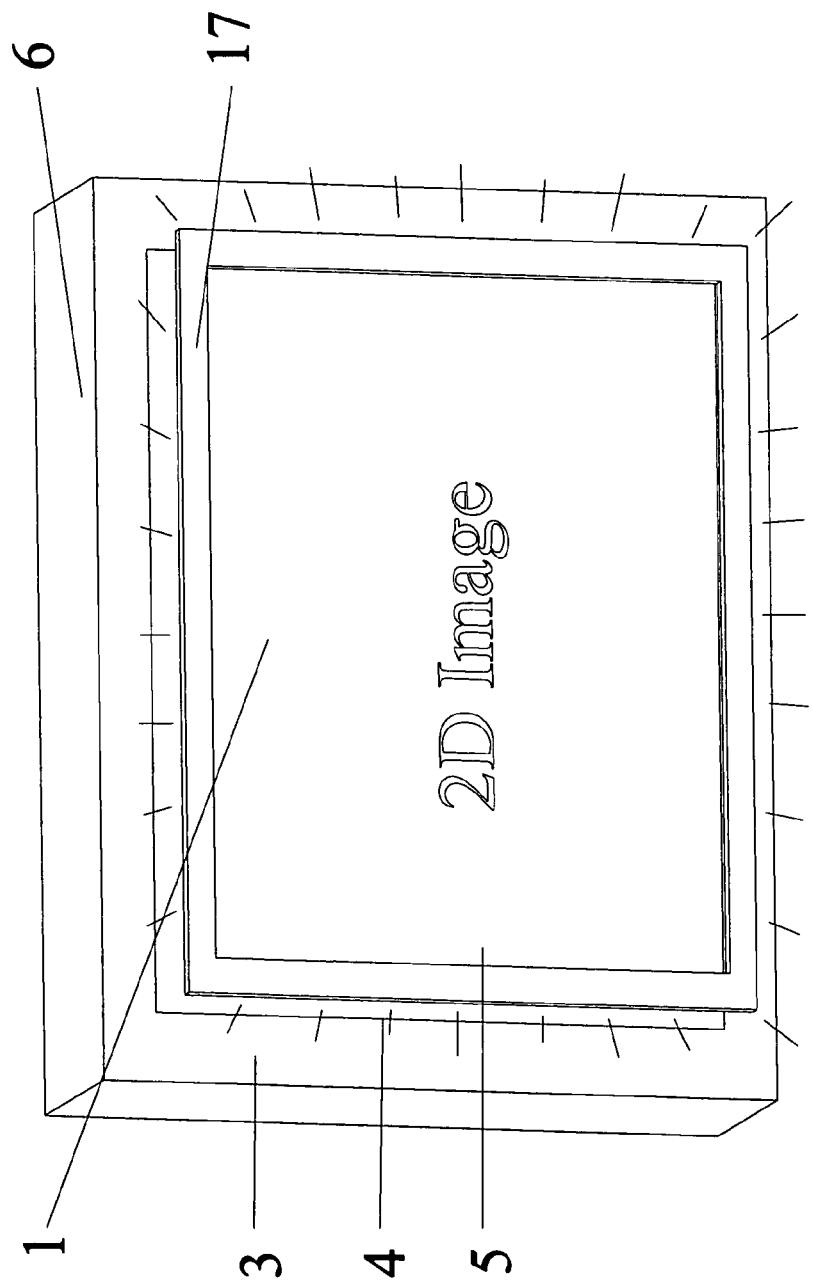
FIG. 8 is a schematic diagram of the system with a generated virtual 3D VIO.

Embodiment No. 2 is shown in FIGS. 4, 5, and 8, and is a system that operates essentially as the fundamental embodiment, but with a computer generated virtual 3D VIO image 17 (FIG. 8), instead of a mechanical VIO, which is electronically displayed 100 at the same time with the 2D image 1. The 3D VIO image 17 is generated by standard video image generation equipment 30 for viewing with a standard form of 3D viewing glasses, two color (usually for black and white 2D images), polarized, or shutter 130, the latter being controlled by a standard device 110 providing a control signal 120 in synchronization with alternating left-right frames of the 3D VIO image 17. The left-right components of the 3D VIO image 17 are generated 30 to make the 3D VIO image 17 appear outside and in front of the image surface 3 when viewed with 3D glasses 130, so that the resulting enhanced scene displayed, the 3D VIO image 17 with the 2D image 1, is seen through the 3D glasses 130 by the viewer as a 2D image 1 on the image surface with a VIO 2 suspended in front of it as in the case of the fundamental embodiment shown in FIG. 1. The 3D VIO image 17 may incorporate edge obscuring for the 2D image 1, or may itself obscure the edge of the 2D image 1. As can be seen from FIG. 4, the 3D VIO image signal 40, which includes a synchronizing 3D VIO control signal 60, is sent to a standard video mixing device 50 for combination with the 2D image signal 35 input from a standard video source 25, which throughputs the synchronizing 3D VIO control signal 60 for transmission to a standard device for controlling viewing glasses 110 with a viewing glasses control signal 120. The combined image signal 70 is then converted 80, if necessary, to a video display signal 90 for the video display 100 being used. As shown in FIG. 5 the synchronizing 3D VIO control signal 60 may be extracted from the combined image signal 70 with the processing in the device for converting the combined image signal for input to display 80, or sent directly to the device for controlling viewing glasses 110 from the device for generating the 3D VIO image 30. The use of the other forms of 3D glasses for viewing a 3D VIO would require the 3D VIO image to be generated with the appropriate colorations or polarization, and would eliminate the need for a 3D glasses controller and its driving signal. Embodiment No. 2 is not a preferred embodiment for normal viewing inasmuch as it suffers from the disadvantage of the necessity for eye wear, but may be of use in diagnostic and treatment applications of the present invention.

Figure 6:
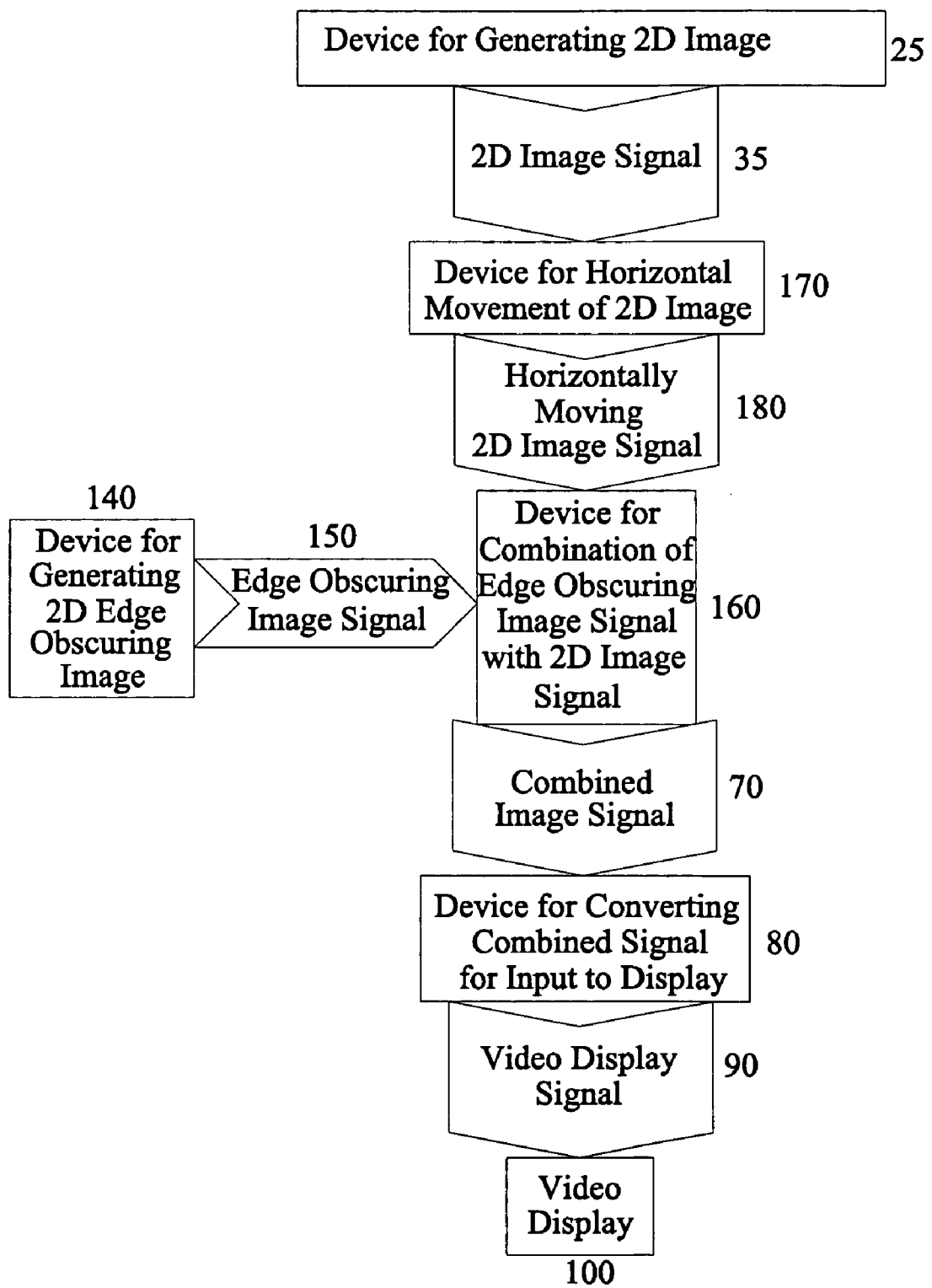
FIG. 6 is a block diagram of an example of the system utilizing an horizontal image movement and edge obscuring.

Embodiment No. 3 shown in FIGS. 6 and 9 is a system which provides the enhancement effect by horizontal motion 20L, 20R (L and R indicating Left and Right movement respectively) of the 2D image 1 with reference to the viewer's point of fixation on the image surface 3, such motion not being significantly perceptible by the viewer, so that a sufficient component of such motion is substantially parallel to the orientation of the viewer's eyes in both directions of such orientation, and is of sufficient speed and frequency to induce a slight but sufficient temporal retinal disparity in the viewer. The term "component of motion" as used herein means the motion represented by one of the components of the velocity vector (well known from the vector representation of uniform linear motion), wherein the velocity vector is resolved into two component velocity vectors at right angles, the magnitude of the resolved vector being the magnitude of the hypotenuse of the right triangle formed by the resolved velocity vector with its components. As in the other embodiments disclosed, such a retinal disparity usually results in fusion of the retinal images in the viewer 9, and thus the enhancement effect. The horizontal movement 20L, 20R, however, may be timed for the individual viewer in order to accommodate the viewer's alternating perception of the disparate retinal images. The system devices may be used to effect such horizontal motion 20L, 20R at any velocity consistent with the characteristics of the display 100, such as refresh rate. Such horizontal motion 20L, 20R may also be regulated with respect to distance, direction, and frequency, so that the 2D image 1 may be moved horizontally 20L, 20R back and forth on the image surface 3, either automatically, under the control of the viewer directly, or as programmed by the viewer. That is, the frequency, the velocity, and the mode of such motion, (such as: slowly to the right, and rapidly back to the left; rapidly to the right, and suddenly back to left to the original or another position; or, suddenly to the right, and back slowly to the left; etc.) may be chosen to suit the viewer. Such control may also be coordinated with the content of the 2D image 1, provided with and as part of the 2D image signal 35, and/or be made subject to the preferences of the viewer. Embodiment No. 3 of the system for horizontal motion 20L, 20R of the 2D image 1 may be mechanical, as in the case of a film projector, front or rear, motion or still. Such motion may be accomplished by the mechanical movement of certain components of a film projector, such as the film gate, aperture plate, or the projector optics; or electromechanically, electronically controlled electrically driven mechanical motion, all of which may be regulated in the same manner as the electronic system previously described.

Embodiment No. 3 optionally lends itself to the use of viewing glasses of the type used with Embodiment No. 2. In this embodiment, however, the viewing glasses alternately shutter each eye as the 2D image 1 is horizontally moved 20L, 20R. The system of Embodiment No. 3 is designed to provide an adequate enhancement effect without the necessity for viewing glasses, but the use thereof is not excluded from use with the system.

As can be seen from FIGS. 6 and 9, Embodiment No. 3 may be employed with edge obscuring by combining an edge obscuring image signal 150 with the horizontally moving 2D image signal 180. An edge obscuring image signal 150 is produced by a standard device for generating 2D edge obscuring image 140 which is combined with the 2D image signal by a standard device 160. The combined image signal 70 is such that the edge obscuring image 18B, 18W (FIG. 9) displayed is relatively stationary relative to the image surface 3, while the 2D image 1 is in horizontal motion 20L, 20R. As shown in FIG. 9 the color of the image surface border 3B, 3W (B and W indicating Black and White colored image surface borders respectively) should match the color and/or pattern of the edge obscuring image 18B, 18W. (Although the image surface borders 3B, 3W are shown in two colors (black and white) in FIG. 9 for purposes of illustration of the variation possible, the border of the image surface 3 would usually have a color and/or pattern which would match the color and/or pattern of the edge obscuring image 18B, 18W). However, as previously discussed, such an edge obscuring image 18B, 18W may also be dynamic in nature, and may be designed to intensify the enhancement effect for the particular 2D image 1 displayed. Also as previously mentioned, edge obscuring in the form shown in FIG. 9 may be practiced independently of Embodiment No. 3, and may be practiced with the fundamental embodiment and Embodiment No. 2.

Figure 7:
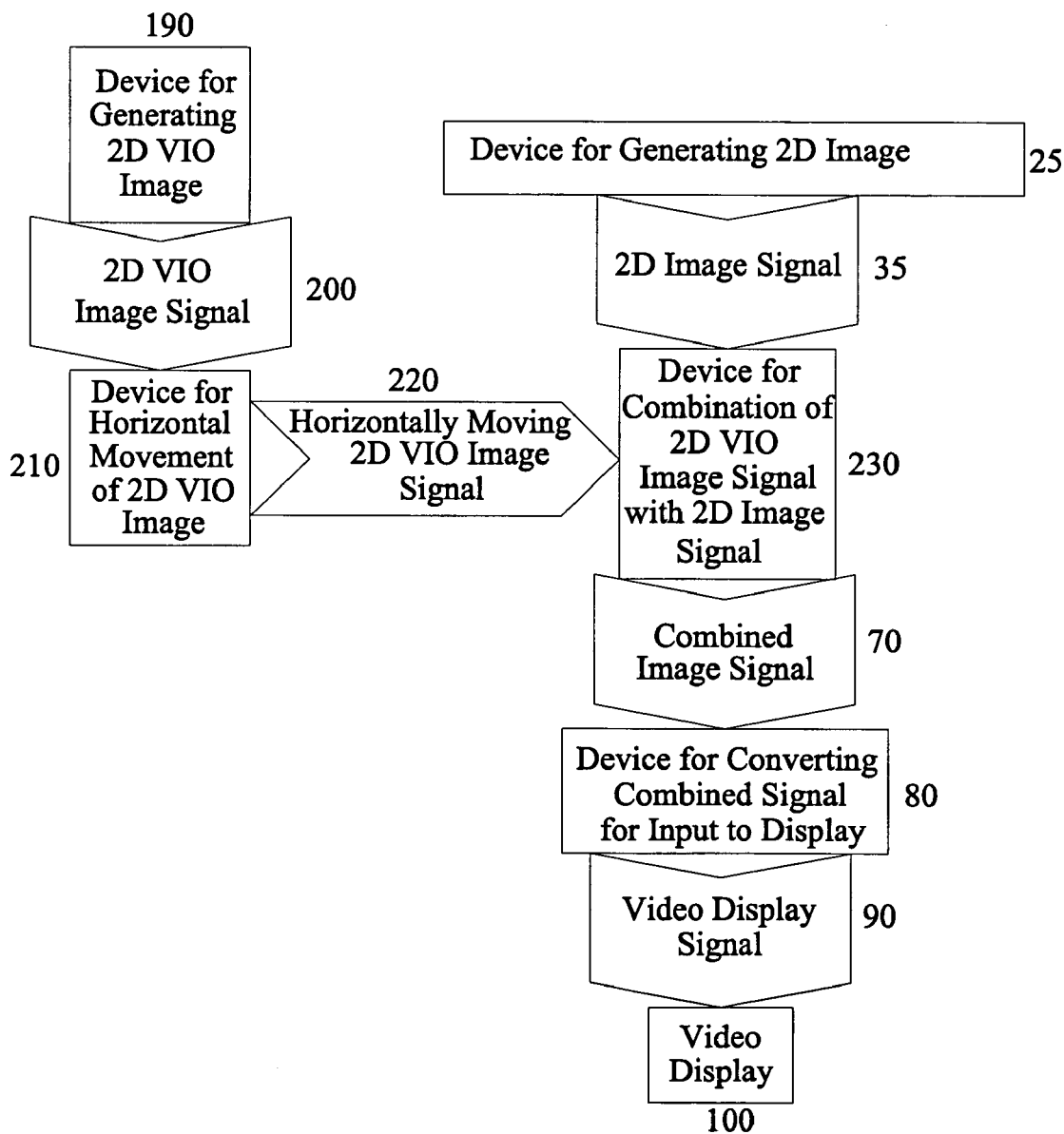
FIG. 7 is a block diagram of an example of the system utilizing horizontal frame image movement.
Figure 10:
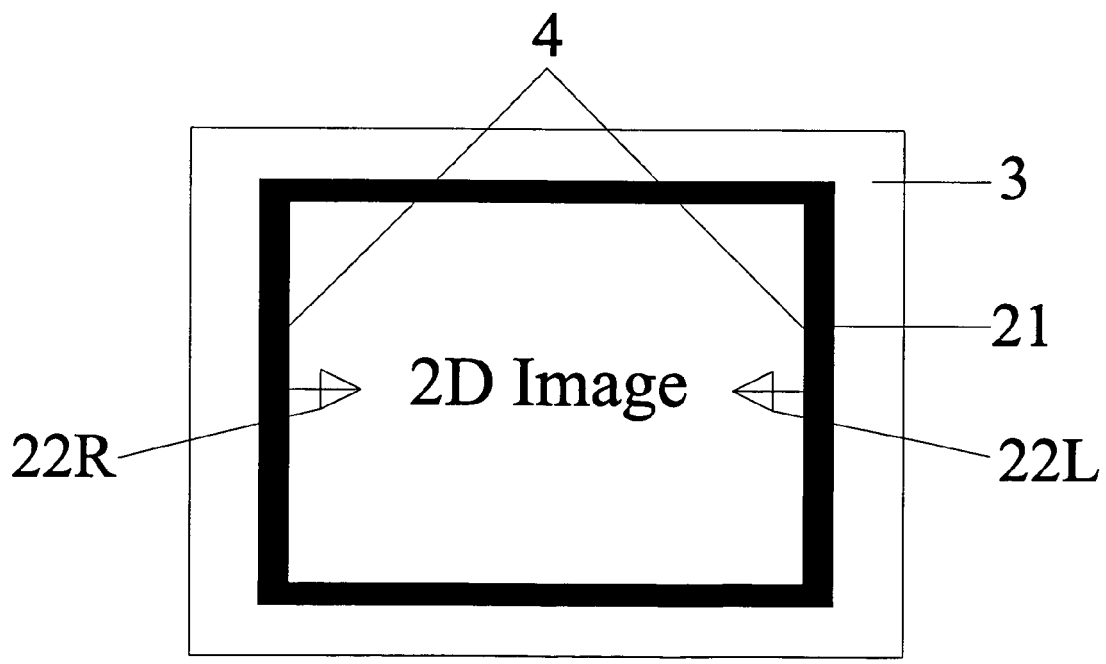
FIG. 10 is a schematic diagram of horizontal frame image movement.

Embodiment No. 4 shown in FIGS. 7 and 10 is a system which induces the slight but sufficient retinal disparity required for the enhancement effect by horizontal motion 22L, 22R (L and R indicating Left and Right movement respectively) of one or more two-dimensional VIO images 21, hereinafter referred to as 2D VIO images, the preferred form of which is a frame that may hereinafter referred to as "2D VIO/frame image" 21, which is displayed with the 2D image 1 to be viewed. The horizontal motion of the 2D VIO/frame image 21 is with respect to a viewer's point of fixation on the image surface with a sufficient component of such motion parallel to the orientation of the viewer's eyes in both directions of such orientation, but is not significantly perceptible by the viewer. Such motion is of sufficient speed and frequency (left and right) to induce a temporal retinal disparity in the viewer. The 2D VIO/frame image 21 may be superimposed upon or surround the 2D image 1. As in the other embodiments disclosed, such a retinal disparity normally results in fusion of the retinal images in the viewer, and thus the enhancement effect. The horizontal motion 22L, 22R, however, may be timed for the individual viewer in order to accommodate the viewer's alternating perception of the disparate retinal images. The system devices may be used to effect such horizontal motion 22L, 22R at any velocity consistent with the characteristics of the display 100, such as refresh rate. Such horizontal motion 22L, 22R may also be regulated with respect to distance, direction, and frequency, so that the 2D image 1 may be moved horizontally 22L, 22R back and forth on the image surface 3, either automatically, under the control of the viewer directly or as programmed by the viewer. That is, the frequency, the velocity, and the mode of such movement (such as: slowly to the right, and rapidly back to the left; rapidly to the right, and suddenly back to left to the original or another position; or, suddenly to the right, and back slowly to the left; etc.), may be chosen to suit the viewer. Such control may also be coordinated with the content of the 2D image 1, provided with and as part of the 2D image signal 35, and/or be made subject to the preferences of the viewer. Where the 2D VIO/frame image 21 completely or partially surrounds the 2D image 1, the 2D image 1 may be reduced in size so that substantially all of the 2D image 1 is displayed within the frame, that is, without cropping by the frame.

Embodiment No. 4 also includes the mechanical, electro-mechanical, or electronically controlled electrically driven mechanical horizontal motion of the 2D VIO image 21, and the regulation thereof, which may be implemented in a substantially similar manner as that described for Embodiment No. 3. The system for horizontal movement 22L, 22R of the 2D/frame image 21 may be mechanical, as in the case of a film projector, front or rear, motion or still. Such motion may be accomplished by the mechanical movement of certain components of a film projector, such as the film gate, aperture plate, or the projector optics; or electromechanically, electronically controlled electrically driven mechanical movement, all of which may be regulated in the same manner as the electronic system previously described.

Embodiment No. 4 also optionally lends itself to the use of viewing glasses of the type used with Embodiment No. 2. In this embodiment, however, the viewing glasses alternately shutter each eye as the 2D VIO/frame image 21 is horizontally moved 22L, 22R. The system of Embodiment No. 4 is designed to provide an adequate enhancement effect without the necessity for viewing glasses, but the use thereof is not excluded from use with the system.

Embodiment No. 4 may also be employed with edge obscuring images 18B, 18W (FIG. 9) by combining an edge obscuring image signal 150 (FIG. 6) with the signal of the horizontally moved 22R, 22L 2D VIO/frame image 21 as is accomplished for the combination in the case of Embodiment No. 3. An edge obscuring image signal 150 (FIG. 6) produced by a standard image generator 140 (FIG. 6) may also be combined with the 2D VIO/frame image signal 220. The combined image signal 70, after conversion for display 90, is such that the edge obscuring image 18B,18W (FIG. 9) displayed is relatively stationary with respect to the 2D image 1 and the image surface 3, as in Embodiment No. 2, while the 2D VIO/frame image 21 is in horizontal motion 22R, 22L. Moreover, the 2D VIO/frame image 21 may be dynamic in nature in the same manner as a dynamic edge obscuring image 18B,18W, and may be designed to intensify the enhancement effect for the particular 2D image 1 displayed.

Embodiment No. 5 (shown only in relation to the drawings for the other embodiments) involves a mechanical VIO, and may be practiced in a manner similar to Embodiment No. 4, but without the flexibility afforded by the use of an electronically generated 2D VIO/frame image 21 (FIG. 10). Horizontal movement of a mechanical VIO at the image surface 3 (not shown in the drawings but essentially portrayed in FIG. 10 in identification with the 2D VIO/frame image 21) may be accomplished by standard forms of mechanical actuation, electrically or mechanically motivated, and electronically or mechanically controlled. Otherwise, substantially the same types of VIO configurations and movements may be used as described for Embodiment No. 4 to produce the enhancement effect. As with all of the embodiments, the full range of edge obscuring techniques are employable to diminish the edge effect.

Embodiment No. 6 is implemented by and within a computer program operating in a computer that generates and/or displays 2D images, such as for animation, art, simulation, graphical representation, and from processing and/or presentation of analog and digitized images generally. The term computer program as used herein shall mean a complete operational computer program, or a component thereof, such as a program overlay, a coded algorithm, or a subroutine. The computer program performs by instructions to the computer for the operations carried out by the configurations of standard components in Embodiments Nos. 3 and 4. Embodiment No. 6 makes the movement of the 2D image and/or the movement of the 2D VIO images practiced by Embodiments Nos. 3 and 4 inherent in and/or included with and/or and adjunct to the 2D images generated or processed by the computer program in its primary function (such as a presentation, gaming, design, animation, artistic expression, word processing, and image processing). A computer program that generates or processes "still" 2D images (such as photographs, graphics and word processing) may include with the generated video frames information for one or more 2D VIO images and their horizontal movement, and/or information for the horizontal motion of the 2D image. Edge obscuring image information may also be incorporated with the information for the generated frames of the 2D image. A computer program that generates or processes a "moving" 2D image, i.e. motion presented by successive still frames (such as animation, cinematography, or television), may include with the generated video frames similar information as that for "still" images appropriate for the characteristics of the "moving" 2D image. The same control of the horizontal movement involved in Embodiments Nos. 3 and 4 may also be practiced with Embodiment No. 6, but controlled by the program and the inputs provided for thereby.

At various points during the course of this disclosure the suggestion has been made that the enhancement effect of the present invention has application to the study of vision, particularly in diagnostics and treatment. It has also been suggested that the principle upon which the present invention operates is newly presented here. In fact there are additional aspects to the enhancement effect of the present invention that plumb the depths of the currently unknown functions of the visual cortex and the operation of binocular retinal rivalry.

While the invention has been disclosed in connection with the example of certain embodiments, it will be understood that there is no intention to limit the invention to the particular embodiments shown. This disclosure is intended to cover the general application of the method and systems specifically disclosed and the various alternative and equivalent constructions included within the spirit and scope of the appended claims.

I claim:

1. A system and device within the system for enhancement of visual perception in a viewer of a two-dimensional image comprising:
   (a) a substantially two-dimensional image displayed on and/or at an image surface; and
   (b) one or more enhancers which induce retinal disparity in the viewing of said two dimensional image, including:
      (1) at least one visually identifiable object positioned in front of the image surface which, together with the two-dimensional image, presents an enhanced scene to a viewer's visual system as an image on the retina of each eye of the viewer with a spatial retinal disparity, the visually identifiable object being:
         a) within the boundary space of the Panum's fusional region for the viewer's view of said two-dimensional image;
         b) at a sufficient distance from said two-dimensional image to render spatially disparate binocular retinal images of the enhanced scene in the Panum's fusional area of the viewer; and
         c) operably associated with said image surface; and/or
      (2) a configuration of standard electronic and/or optical and/or mechanical components which:
         a) moves said two-dimensional image horizontally with respect to a viewer's point of fixation on the image surface so that a sufficient component of such motion is parallel to the orientation of the viewer's eyes, in both directions of said orientation with sufficient speed and frequency to induce a temporal retinal disparity in the viewer; and/or
         b) generates a two-dimensional image of a visually identifiable object at or on the image surface which is seen by the viewer with said two-dimensional image, and moves said visually identifiable object image horizontally with respect to a viewer's point of fixation on the image surface so that a sufficient component of such motion is parallel to the orientation of the viewer's eyes, in both directions of said orientation with sufficient speed and frequency to induce a temporal retinal disparity in the viewer; and/or
      (3) a computer program operating in a computer, said computer program having generated the two-dimensional image, and which:
         a) moves said two-dimensional image horizontally with respect to a viewer's point of fixation on the image surface so that a sufficient component of such motion is parallel to the orientation of the viewer's eyes, in both directions of said orientation with sufficient speed and frequency to induce a temporal retinal disparity in the viewer; and/or
         b) generates a two-dimensional image of a visually identifiable object which is seen by the viewer on the image surface with said two-dimensional image, and moves said visually identifiable object image horizontally with respect to a viewer's point of fixation on the image surface so that a sufficient component of such motion is parallel to the orientation of the viewer's eyes, in both directions of said orientation with sufficient speed and frequency to induce a temporal retinal disparity in the viewer;

which causes the viewer's visual system to enhance the viewer's perception of depth in said two-dimensional image and/or enhance the clarity of said two-dimensional image by the fusion of said retinally disparate images of said two-dimensional image.

2. The system and device within the system for enhancement of visual perception of claim 1 wherein said two-dimensional image has one or more monocular depth cues.

3. The system and device within the system for enhancement of visual perception of claim 1 wherein said image surface is curved, horizontally and/or vertically.

4. The system and device within the system for enhancement of visual perception of claim 1 wherein said at least one visually identifiable object is a complete or partial frame surrounding all or part of said two-dimensional image, the size, shape, color, brightness, illumination, and/or movement of which is fixed or variable, such variability being controlled with reference to the brightness, color, and/or monocular depth cues of said two-dimensional image, or otherwise programably controlled to intensify the enhancement effect and/or accommodate the viewer.

5. The system and device within the system for enhancement of visual perception of claim 1 wherein a pattern which is visually discernable by said viewer of said two-dimensional image is applied to at least one of the surfaces of said visually identifiable object which faces said viewer, the size, shape, color, brightness, illumination, and/or movement of which is fixed or variable, such variability being controlled with reference to the brightness, color, and/or monocular depth cues of said two-dimensional image, or otherwise programably controlled to intensify the enhancement effect and/or accommodate the viewer.

6. A system and device within the system for enhancement of visual perception in a viewer of a substantially two-dimensional image comprising:
   (a) a substantially two-dimensional image displayed on and/or at an image surface; and
   (b) at least one visually identifiable object operably associated with the image surface which, together with said two-dimensional image, presents an enhanced scene to a viewer's visual system, said at least one visually identifiable object being positioned in front of said image surface:
      1) within the boundary space of the Panum's fusional region for the viewer's view of said two-dimensional image; and
      2) at a sufficient distance from said two-dimensional image to render spatially disparate binocular retinal images of the enhanced scene in the Panum's fusional areas of the viewer; and
   which causes the viewer's visual system to enhance the viewer's perception of depth in said two-dimensional image and/or enhance the clarity of said two-dimensional image by the fusion of said disparate binocular retinal images of said two-dimensional image.

7. The system and device within the system for enhancement of visual perception of claim 6 wherein said visually identifiable object is a virtual three-dimensional image appearing to the viewer to be in front of the two dimensional image, said virtual three-dimensional image being viewable as such as the same time as the two-dimensional image.

8. The system and device within the system for enhancement of visual perception of claim 6 wherein said two-dimensional image has one or more monocular depth cues.

9. The system and device within the system for enhancement of visual perception of claim 6 wherein said visually identifiable object is substantially within the depth of field of focus of said viewer's eyes when said two-dimensional image is substantially in focus for said viewer, and/or is in substantial focus when any point of said two-dimensional image is directly binocularly regarded by said viewer.

10. The system and device within the system for enhancement of visual perception of claim 6 wherein a pattern which is visually discernable by said viewer of said two-dimensional image is applied to at least one of the surfaces of said visually identifiable object which faces said viewer, the size, shape, color, brightness, illumination, and/or movement of which is fixed or variable, such variability being controlled with reference to the brightness, color, and/or monocular depth cues of said two-dimensional image, or otherwise programably controlled to intensify the enhancement effect and/or accommodate the viewer.

11. The system and device within the system for enhancement of visual perception of claim 6 wherein said at least one visually identifiable object is a complete or partial frame surrounding all or part of said two-dimensional image, the size, shape, color, brightness, illumination, and/or movement of which is fixed or variable, such variability being controlled with reference to the brightness, color, and/or monocular depth cues of said two-dimensional image, or otherwise programably controlled to intensify the enhancement effect and/or accommodate the viewer.

12. The system and device within the system for enhancement of visual perception of claim 11 wherein the frame is a hood.

13. The system and device within the system for enhancement of visual perception of claim 6 wherein said at least one visually identifiable object is illuminated on at least one of the surfaces which faces said viewer, the source of such illumination being attached to and/or within said at least one visually identifiable object.

14. The system and device within the system for enhancement of visual perception of claim 13 wherein the illumination of said at least one visually identifiable object is fixed or variable in intensity, color, and/or polarization, such variability being controlled with reference to the brightness, color, and/or monocular depth cues of said two-dimensional image, or otherwise programably controlled to intensify the enhancement effect and/or accommodate the viewer.

15. The system and device within the system for enhancement of visual perception of claim 6 wherein said two-dimensional image is illuminated.

16. The system and device within the system for enhancement of visual perception of claim 15 wherein the illumination of said two-dimensional image is from a source within or attached to said visually identifiable object so that said viewer is shielded from such illumination.

17. The system and device within the system for enhancement of visual perception of claim 16 wherein the intensity, color or polarization of the illumination of said two-dimensional image is fixed or variable, such variability being controlled with reference to the brightness, color, and/or monocular depth cues of said two-dimensional image, or otherwise programably controlled to intensify the enhancement effect and/or accommodate the viewer.

18. A system and device within the system for enhancement of visual perception in a viewer of a substantially two-dimensional image comprising:
   (a) a substantially two-dimensional image displayed on and/or at an image surface; and
   (b) an enhancer which induces retinal disparity in the viewing of said two dimensional image, further comprising a configuration of standard electronic and/or optical and/or mechanical components which:
      (1) moves said two-dimensional image horizontally with respect to a viewer's point of fixation on the image surface so that a significant component of such motion is parallel to the orientation of the viewer's eyes, in both directions of said orientation with sufficient speed and frequency to induce a temporal retinal disparity in the viewer; and/or
      (2) generates a two-dimensional image of a visually identifiable object at or on the image surface which is seen by the viewer with said two-dimensional image, and moves the two-dimensional image of a visually identifiable object horizontally with respect to a viewer's point of fixation on the image surface so that a significant component of such motion is parallel to the orientation of the viewer's eyes, in both directions of said orientation with sufficient speed and frequency to induce a temporal retinal disparity in the viewer;
   which causes the viewer's visual system to enhance the viewer's perception of depth of said two-dimensional image and/or enhance the clarity of said two-dimensional image by the fusion of said retinally disparate images of said two dimensional image.

19. The system and device within the system for enhancement of visual perception of claim 18 wherein said two-dimensional image has one or more monocular depth cues.

20. The system and device within the system for enhancement of visual perception of claim 19 wherein the horizontal motion of said two-dimensional image of a visually identifiable object and/or said two-dimensional image is not significantly perceptible as such by a viewer.

21. The system and device within the system for enhancement of visual perception of claim 19 wherein the horizontal motion of said two-dimensional image of a visually identifiable object and/or said two-dimensional image is controlled with reference to the brightness, color, and/or monocular depth cues of said two-dimensional image, or otherwise programably controlled to intensify the enhancement effect and/or accommodate said viewer.

22. An apparatus for enhancement of visual perception in a viewer of a two-dimensional image comprising:
   (a) an image surface upon which the two-dimensional image is displayed; and
   (b) one or more enhancers which induce retinal disparity in the viewing of the two dimensional image, including at least one of the following group of four enhancers:
      (1) at least one visually identifiable object positioned in front of the image surface which presents an enhanced scene to a viewer's visual system as an image on the retina of each eye of the viewer with a spatial retinal disparity, the visually identifiable object being:
         a) within the boundary space of the Panum's fusional region for the viewer's view of said two-dimensional image;
         b) at a sufficient distance from said two-dimensional image to render spatially disparate binocular retinal images of the enhanced scene in the Panum's fusional area of the viewer; and
         c) operably associated with said image surface;
   and/or
      (2) a configuration of standard electronic and/or optical and/or mechanical components which moves said two-dimensional image horizontally with respect to a viewer's point of fixation on the image surface so that a sufficient component of such motion is parallel to the orientation of the viewer's eyes, in both directions of said orientation with sufficient speed and frequency to induce a temporal retinal disparity in the viewer; and/or
      (3) a configuration of standard electronic and/or optical and/or mechanical components which generates a two-dimensional image of a visually identifiable object at or on the image surface which is seen by the viewer with said two-dimensional image, and moves said visually identifiable object image horizontally with respect to a viewer's point of fixation on the image surface so that a sufficient component of such motion is parallel to the orientation of the viewer's eyes, in both directions of said orientation with sufficient speed and frequency to induce a temporal retinal disparity in the viewer;
      (4) a computer program operating in a computer, said computer program having generated said two-dimensional image, and which:
         a) moves said two-dimensional image horizontally with respect to a viewer's point of fixation on the image surface so that a sufficient component of such motion is parallel to the orientation of the viewer's eyes, in both directions of said orientation with sufficient speed and frequency to induce a temporal retinal disparity in the viewer; and/or
         b) generates a two-dimensional image of a visually identifiable object which is seen by the viewer on the image surface with said two-dimensional image, and moves said visually identifiable object image horizontally with respect to a viewer's point of fixation on the image surface so that a sufficient component of such motion is parallel to the orientation of the viewer's eyes, in both directions of said orientation with sufficient speed and frequency to induce a temporal retinal disparity in the viewer;

which cause the viewer's visual system to enhance the viewer's perception of depth in said two-dimensional image and/or enhance the clarity of said two-dimensional image by the fusion of said retinally disparate images of said two-dimensional image.

23. A method for enhancement of visual perception in a viewer of a two-dimensional image comprising: the induction of a slight but sufficient retinal disparity in the viewer's view of the two-dimensional image, thus effecting the enhancement of said viewer's depth perception and/or clarity perception in the two-dimensional image by and/or with the viewer's fusion of said disparate retinal images.

24. A system and device within the system for enhancement of visual perception in a viewer of a two-dimensional image comprising:
   (a) a substantially two-dimensional image displayed on and/or at an image surface; and
   (b) one or more enhancers which induce retinal disparity in the viewing of said two dimensional image; and
   (c) a visual system with a normal capacity for fusion of said retinally disparate images of said two-dimensional image;

which causes the viewer's visual system to enhance the viewer's perception of depth in said two-dimensional image and/or enhance the clarity of said two-dimensional image.

25. A system and device within the system for enhancement of visual perception in a viewer of a two-dimensional image comprising:
   (a) a substantially two-dimensional image displayed on and/or at an image surface; and
   (b) one or more enhancers which induce retinal disparity in the viewing of said two dimensional image;

which cause the viewer's visual system to enhance the viewer's perception of depth in said two-dimensional image and/or enhance the clarity of said two-dimensional image by the fusion of said retinally disparate images of said two-dimensional image.

26. The system and device within the system for enhancement of visual perception of claim 25 wherein the enhancer comprises at least one visually identifiable object positioned in front of the image surface which, together with the two-dimensional image, presents an enhanced scene to a viewer's visual system as an image on the retina of each eye of the viewer with a spatial retinal disparity, the visually identifiable object being:
   (a) substantially within the depth of field of focus of said viewer's eyes when said two-dimensional image is in focus for said viewer; and
   (b) a sufficient distance from the two-dimensional image to induce disparate binocular retinal images in the eyes of the viewer.

27. The system and device within the system for enhancement of visual perception of claim 25 wherein the enhancer comprises at least one visually identifiable object positioned in front of the image surface which, together with the two-dimensional image, presents an enhanced scene to a viewer's visual system as an image on the retina of each eye of the viewer with a spatial retinal disparity, the visually identifiable object being:
(a) within the boundary space of the Panum's fusional region for the viewer's view of said two-dimensional image;
(b) at a sufficient distance from said two-dimensional image to render spatially disparate binocular retinal images of the enhanced scene in the Panum's fusional area of the viewer.

28. The system and device within the system for enhancement of visual perception of claim 25 wherein the enhancer comprises a configuration of standard electronic and/or optical and/or mechanical components which:
(a) generates a two-dimensional image of a visually identifiable object at or on the image surface which is seen by the viewer with said two-dimensional image, and moves said visually identifiable object image horizontally with respect to a viewer's point of fixation on the image surface so that a sufficient component of such motion is parallel to the orientation of the viewer's eyes, in both directions of said orientation with sufficient speed and frequency to induce a temporal retinal disparity in the viewer; and/or
(b) moves said two-dimensional image horizontally with respect to a viewer's point of fixation on the image surface so that a sufficient component of such motion is parallel to the orientation of the viewer's eyes, in both directions of said orientation with sufficient speed and frequency to induce a temporal retinal disparity in the viewer.

29. The system and device within the system for enhancement of visual perception of claim 25 wherein the enhancer comprises a computer program operating in a computer, said computer program having generated the two-dimensional image, and which:
(a) generates a two-dimensional image of a visually identifiable object which is seen by the viewer on the image surface with said two-dimensional image, and moves said visually identifiable object image horizontally with respect to a viewer's point of fixation on the image surface so that a sufficient component of such motion is parallel to the orientation of the viewer's eyes, in both directions of said orientation with sufficient speed and frequency to induce a temporal retinal disparity in the viewer; and/or
(b) moves said two-dimensional image horizontally with respect to a viewer's point of fixation on the image surface so that a sufficient component of such motion is parallel to the orientation of the viewer's eyes, in both directions of said orientation with sufficient speed and frequency to induce a temporal retinal disparity in the viewer.

* * * * *